(12) United States Patent
Dharan

(10) Patent No.: US 11,873,801 B2
(45) Date of Patent: Jan. 16, 2024

(54) MECHANICAL BRAKE FOR FLYWHEELS

(71) Applicant: Hari Dharan, LLC, Pleasant Hill, CA (US)

(72) Inventor: Cheruvari Karthik Hari Dharan, Pleasant Hill, CA (US)

(73) Assignee: Hari Dharan, LLC, Pleasant Hill, CA (US)

( * ) Notice: Subject to any disclaimer, the term of this patent is extended or adjusted under 35 U.S.C. 154(b) by 789 days.

(21) Appl. No.: 17/010,710

(22) Filed: Sep. 2, 2020

(65) Prior Publication Data

US 2021/0088031 A1    Mar. 25, 2021

Related U.S. Application Data

(60) Provisional application No. 62/895,941, filed on Sep. 4, 2019.

(51) Int. Cl.

| *F03G 3/08*   | (2006.01) |
| *F16D 65/84*  | (2006.01) |
| *F16D 65/16*  | (2006.01) |
| *F16D 63/00*  | (2006.01) |
| *F16D 65/847* | (2006.01) |
| *F16D 65/853* | (2006.01) |
| *H02K 7/02*   | (2006.01) |
| *F16D 55/00*  | (2006.01) |
| *F16D 49/00*  | (2006.01) |

(Continued)

(52) U.S. Cl.
CPC ............... *F03G 3/08* (2013.01); *F16D 49/00* (2013.01); *F16D 55/00* (2013.01); *F16D 63/004* (2013.01); *F16D 65/16* (2013.01); *F16D 65/78* (2013.01); *F16D 65/84* (2013.01); *F16D 65/847* (2013.01); *F16D 65/853* (2013.01); *F16D 69/02* (2013.01); *H02K 7/025* (2013.01); *F16D 2065/024* (2013.01); *F16D 2065/781* (2013.01); *F16D 2065/782* (2013.01); *F16D 2065/783* (2013.01); *F16D 2065/784* (2013.01); *F16D 2065/787* (2013.01); *F16D 2065/788* (2013.01); *F16D 2065/789* (2013.01); *F16D 2121/22* (2013.01)

(58) Field of Classification Search
CPC ......... F16D 2065/781; F16D 2065/782; F16D 2065/787; F16D 2065/788; F16D 2065/789

See application file for complete search history.

(56) References Cited

U.S. PATENT DOCUMENTS

| 3,436,572 | A  | * | 4/1969  | Storsand ................. H02K 7/16 310/66 |
| 4,419,857 | A  | * | 12/1983 | Smith ..................... F16D 65/38 56/10.8 |
| 7,654,355 | B1 | * | 2/2010  | Williams ................. B60L 7/14 180/65.21 |

FOREIGN PATENT DOCUMENTS

DE           19915618 A1  *  10/2000   ............. B30B 15/10

* cited by examiner

*Primary Examiner* — Vicky A Johnson
(74) *Attorney, Agent, or Firm* — Foley & Lardner LLP

(57) ABSTRACT

The flywheel device includes a sealed housing section; a rotor located in the sealed housing section where the rotor is held in a vertical position by a magnetic system; a controller coupled to the magnetic system; and a braking annular ring mounted to the sealed housing section below the rotor, where the rotor contacts the braking annular ring when the rotor is lowered or otherwise dropped from the vertical position. The controller performs operations to provide control signals to provide first power to the magnetic system to hold the rotor in the vertical position and provide second (Continued)

control signals to provide second power to the magnetic system to lower the rotor.

20 Claims, 5 Drawing Sheets

(51) Int. Cl.
*F16D 69/02* (2006.01)
*F16D 65/78* (2006.01)
*F16D 121/22* (2012.01)
*F16D 65/02* (2006.01)

MECHANICAL BRAKE FOR FLYWHEELS

BACKGROUND

The following description is provided to assist the understanding of the reader. None of the information provided or references cited is admitted to being prior art.

A flywheel designed for storing energy typically consists of a vertical-axis rotor supported by a pair of magnetic levitation (maglev) or rolling element bearings, rotated by a motor/generator with an active control system. Electrical energy sent to the motor is converted to kinetic energy by spinning the rotor. As the rotational speed of the rotor increases, it stores increasing levels of energy (charging phase); the speed decreases when energy is drawn from the system (discharging phase).

In normal operation, the rotor speed is increased as energy is fed into the motor and decreased when energy is taken out of the system. The principle is simple, the response time between charge and discharge is short, the lifetime of the device is very large, and the power handling capacity is far better than batteries. These features have led to flywheels being considered for rapid energy charge/discharge applications.

One major issue, however, is the necessity to reduce the kinetic energy rapidly in the event of malfunctions or external perturbations. The latter may consist of a seismic event, impact to the device by an external object or by an explosion, indications of crack initiation, bearing seizure, motor failure, etc. In such situations, it is highly desirable that the rotor speed be reduced rapidly, and the rotor brought to a safe stop.

SUMMARY

In accordance with some aspects of the present disclosure, one embodiment relates to a method for braking high-speed flywheel rotors safely and rapidly. It consists of the placement of a stationary annular ring, the "braking" or "landing" ring that is axisymmetric with respect to the rotor axis and situated below the lower lateral surface of a rotor. The braking ring is made of bare metal such as steel or cast iron or surfaced with brake lining pads bolted to the ring. This arrangement allows for replacement of the pads when worn as is done, for example, for automotive brakes.

Another embodiment relates to a flywheel device including a sealed housing section; a rotor located in the sealed housing section; and a braking annular ring mounted to the sealed housing section below the rotor.

Yet another embodiment relates to a flywheel device including a sealed housing section; a rotor located in the sealed housing section, the rotor held in a vertical position by a magnetic system; and a braking annular ring mounted to the sealed housing section below the rotor, wherein the rotor contacts the braking annular ring when the rotor is lowered from the vertical position.

Further still another embodiment relates to a flywheel system comprising a flywheel device and a controller. The flywheel device includes a sealed housing section; a rotor located in the sealed housing section, wherein the rotor is held in a vertical position by a magnetic system; a controller coupled to the magnetic system; and a braking annular ring mounted to the sealed housing section below the rotor, where the rotor contacts the braking annular ring when the rotor is lowered from the vertical position. The controller performs operations to provide control signals to provide first power to the magnetic system to hold the rotor in the vertical position and provide second control signals to provide second power to the magnetic system to lower the rotor.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTIONS OF THE DRAWINGS

Figure 1:
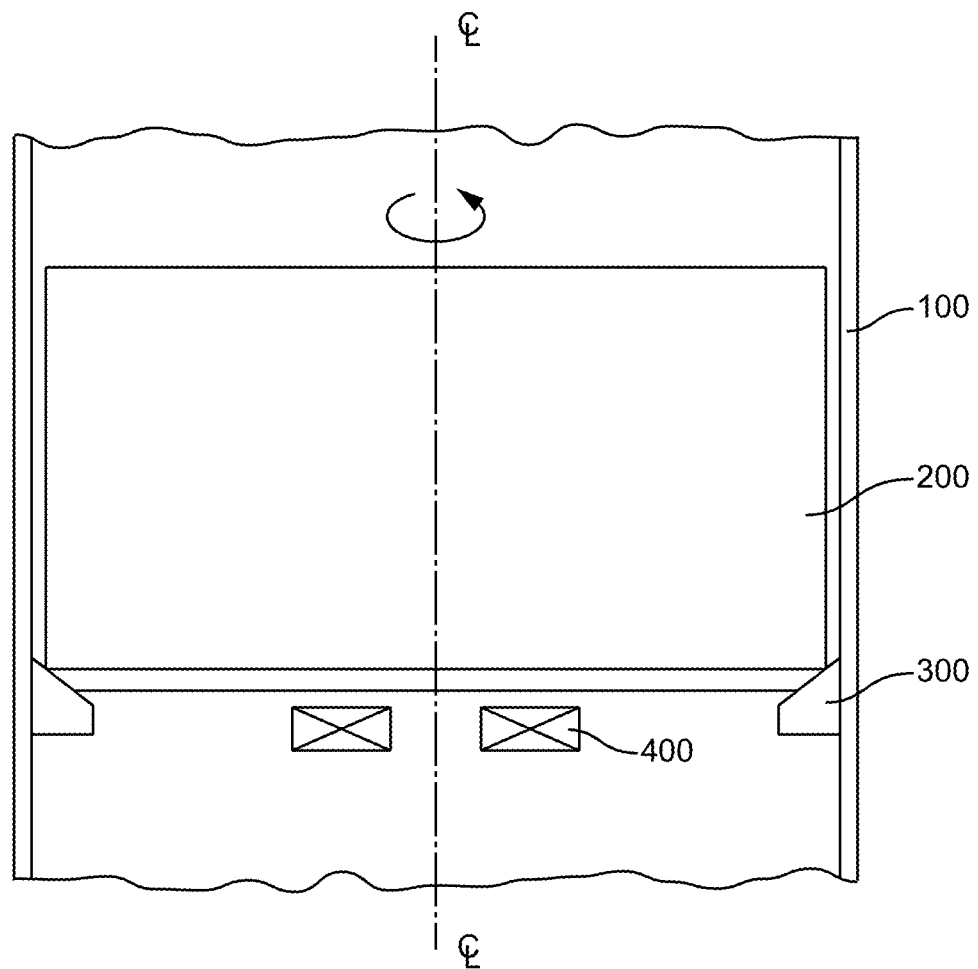
FIG. 1 is a schematic view diagram of a mechanical brake for a high-speed flywheel rotor, according to an example embodiment.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 illustrates a schematic of a mechanical brake for a flywheel assembly. More specifically, FIG. 1 shows a cylindrical vacuum housing of a flywheel 100 and a rotor 200 resting on a braking ring 300. Braking ring 300 is a stationary annular ring, or a set of discontinuous annular pads and configured such that the "braking" or "landing" ring is axisymmetric with respect to a rotor axis of rotor 200 and situated below the lower lateral surface of rotor 200. The braking ring 300 is made of bare metal such as steel or cast iron or surfaced with brake lining pads bolted to the ring. This arrangement allows for replacement of the pads when worn, a major advantage for ensuring a long life of the unit with minimal added cost and downtime. The position shown corresponds to the braking (non-operating) mode of the flywheel. For operation, magnetic bearings 400 of a magnetic system 410 are energized, causing the rotor to be lifted off the braking ring 300 for spinning and storing energy.

Figure 2:
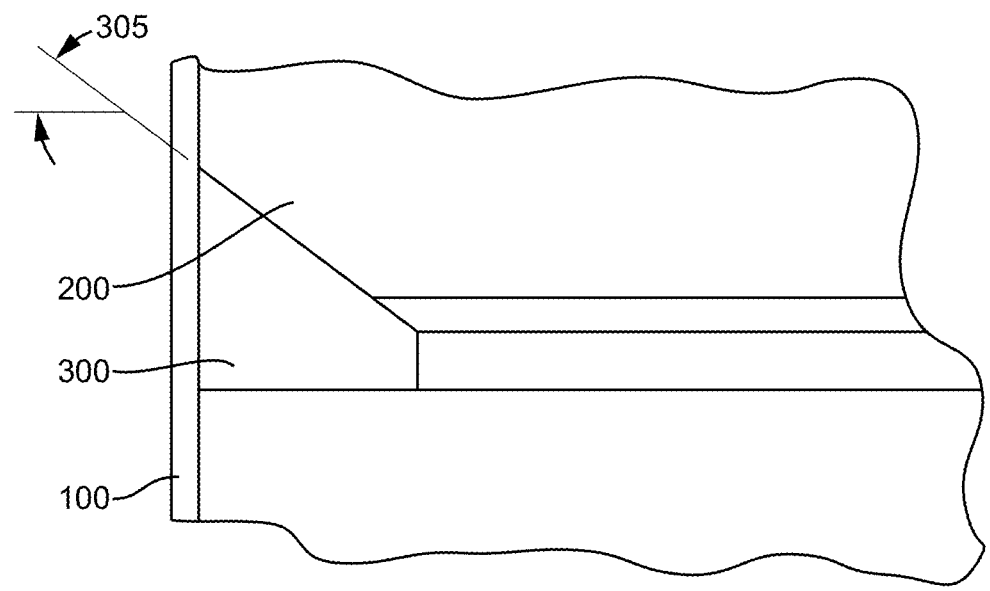
FIG. 2 is a detailed view of a metal rotor sliding on a metal braking ring, according to an example embodiment.

FIG. 2 shows a close-up schematic of the braking ring 300 in direct contact between the braking ring 300 and rotor 200. The angle of contact 305 is also shown. When the angle is zero, the braking is axial, like that of an automobile disk brake. At other angles, the braking ring acts like a conical brake. During operation, rotor 200 is lifted off the braking ring 300 by magnetic levitation or another method followed by rotation by the motor/generator. In most flywheel systems, the vertical position of the rotor is controlled by the maglev bearings or by an off-loading magnet arrangement that consists of permanent magnets, electromagnets, or combinations of the two. The rotor is kept in the vertical position through any means. The maglev arrangement or off-loading magnet arrangement is controlled by a controller (not shown). In some cases, the controller determines that rotor 200 needs to stop spinning (e.g., in an emergency). For example, the controller receives an indication from another device or determines, based on sensor data, that an emergency situation has arisen such as, but not limited to, the flywheel device or a device with which the flywheel device is associated, is overheating. Other examples of emergencies include, but are not limited to, impact to the device by an external object or by an explosion, bearing seizure, motor failure, detection of crack initiation, etc. In such instances, the controller sends a signal (or stops sending signals) to a driver to stop powering the magnetic system 410. Consequently, the force providing the vertical lift of rotor 200 is relaxed and the spinning rotor 200 allowed to land on braking ring 300. The friction between rotor 200 and braking ring 300 results in rapid deceleration of rotor 200. Since high-speed flywheels operate in a vacuum, little oxidation or combustion is expected from the high temperatures generated by the sliding friction between the rotor and the braking ring.

The mechanics of how the rotor decelerates depends upon the rotor weight, its size, speed, and the nature of the sliding surfaces. In the case where the contacting surface of the rotor is made of steel and the braking surface is also steel, the deceleration is very rapid. In an exemplary case, a 3,000 kg rotor, 1-meter in diameter, required a landing ring contact zone of 10 mm wide to develop a braking normal pressure of less than 1 megapascal (145 pounds per square inch). This value is well within the compressive strength of common brake lining materials, the maximum permissible compressive stress, or in steel-to-steel contact.

Figure 3:
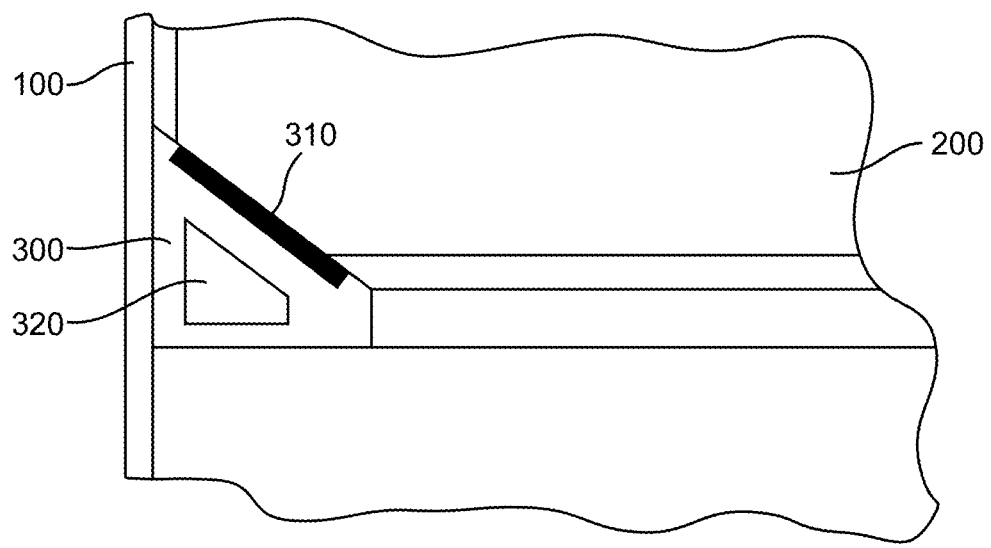
FIG. 3 is a diagram of a mechanical brake where a braking ring is of hollow construction that is filled with recirculating coolant, according to an example embodiment.

FIG. 3 shows a friction material insert 310 (e.g., a brake lining pad) acting like a brake pad onto which the rotor is lowered. Also shown is a hollow annular space 320 in braking ring 300 through which a cooling fluid 325 is circulated to enhance cooling of the braking ring 300. In some embodiments, the braking ring 300 has its sliding surfaces covered with various friction materials such as glass/phenolic or carbon/carbon brake linings, or various bare metals, composites, ceramics or combinations of materials to provide the desired frictional coefficients and wear rates. Friction materials behave very well in a vacuum, and non-oxidative environments, exhibiting low wear rates and limited or no combustion products.

In the case of carbon fiber rotors, the first application of the braking process results in carbonization of the polymer matrix at and near the rubbing interface. Note that carbonization occurs in a vacuum or non-oxidative atmosphere. The resulting carbonized material is similar to carbon/carbon composites used in aircraft brakes, re-entry space vehicles and rocket nozzles which are capable of withstanding temperatures well in excess of 1000 C. This means that the mechanical braking arrangement described herein will not damage or deteriorate a carbon fiber rotor, therefore allowing multiple braking and re-starting of the flywheel without additional servicing or repairs.

In one embodiment, the braking ring is a simple steel ring (or steel ring segments) welded to the inside of the housing (FIGS. 1 and 2). In another embodiment, the braking ring surface proximal and in contact with the rotor carries inserts of friction material as used in vehicle brake pads. The surface contact may be axial (contact angle of zero), or conical when the contact angle is greater than 0 degrees depending upon the desired ratio of the axial braking force to the radial braking force. A contact angle of 0 degrees corresponds to a disk brake (axial braking configuration). A separate drum brake configuration may be added above the braking ring to apply additional braking forces to the rotor in combination with the axial braking ring configuration. For the drum brake configuration, the friction material is radially articulated via a suitable linkage to provide the level of braking force desired. Both radial and axial braking can be employed simultaneously for increased energy dissipation and shorter braking times.

In the afore-described arrangement, the rotor sliding on the landing ring is similar to the action of a cylindrical/conical clutch or brake. The width of the landing ring establishes the contact pressure when it is subjected to the weight of the rotor (when no radial braking is employed). The magnitude of the contact pressure can be designed to be well within the frictional parameters of standard automotive and aircraft phenolic-based or carbon-carbon friction materials.

A second benefit of the mechanical braking method described above relates to rotor "touchdown". Magnetic levitation of flywheel rotors has the advantage of contactless operation since the spinning rotor is suspended between two actively controlled electromagnets. While mechanical (rubbing) friction is eliminated, failure of the control system results in catastrophic failure of the entire unit since the high speed and weight of the rotor will quickly destroy the maglev bearings and, perhaps, even the housing, with the potential for high speed debris release. Thus, all magnetic levitation bearing systems incorporate touchdown rolling contact bearings, (typically angular contact ball bearings) to effect safe deceleration of the rotor in the event of a controller or maglev bearing failure. Even so, the time taken to slow the rotor is defined by the magnitude of the power rating of the flywheel and also the available load that is connected to the flywheel energy storage system. For example, a flywheel rated at 8 kW power and an energy storage capacity of 32 kWh will take 4 hours to dissipate all of its maximum stored energy if an 8 kW load is available at the time of the emergency. This may not always be the case. To solve this problem, an external resistive load is necessary and available to discharge the energy; the control system has to the device first to the discharge mode and then to the external load, taking up valuable time before the emergency shut-down sequence is initiated.

Amore serious deficiency relates to the fact that touchdown rolling contact bearings have severe limitations when subjected suddenly to a spinning load which results in skidding and severe local temperature rise causing rapid failure of the touchdown bearing. This deficiency restricts the use of touchdown bearings to relatively small rotors or slow spinning rotors. This is because rolling contact touchdown bearings have a very limited life when subjected suddenly to the full weight of a high speed rotor. For example, the life of a typical rolling contact bearing subjected to a suddenly applied weight of a 1000 kg rotor spinning at 6000 rpm is about 16 hours. While this amount of time may be sufficient for safe shut-down, the touchdown bearing is invariably destroyed in the process and has to be replaced before the device can be placed back into service. This procedure will need to be performed every time the touchdown bearing system is activated.

In addition, since bearing life is inversely proportional to the cube of the applied load, the size (and, thereby, the weight) of the rotor is severely restricted in such an arrangement. For example, if the mass of the 1000 kg rotor in the example above is doubled, the energy stored will also be doubled. If the power rating is also doubled, the time taken to discharge the rotor from full charge is the same (4 hours). However, the touchdown bearing life will now be only about 2 hours, resulting in its catastrophic failure, making this approach unfeasible. In addition, the external load will also need to be doubled, adding expense and taking up additional space.

For large and heavy rotors, therefore, it is highly desirable to have a way to rapidly slow a rotor without the need for conventional touchdown bearings or external load resistors. Such an arrangement, as is taught here, would also allow for the safe operation of large flywheels with greater energy storage capacities which would have the potential for much lower cost (per kWh stored).

Increasing kinetic energy storage capacity is desirable both from a cost standpoint as well as from considerations of energy storage density. The latter is important to minimize the footprint required for a given level of energy storage desired. Both considerations require employing larger and heavier rotors which are not possible easy to accomplish due to the load limitations of touchdown bearings.

The arrangement described above for braking the rotor, however, avoids these limitations. Under normal operation, the rotor is levitated by the maglev bearing system and spun up to full operating speed. Should the maglev bearing system fail or is inadvertently disconnected, the rotor will drop onto the braking ring and allowed to slide to a stop. In other words, the mechanical braking arrangement has the dual purpose of acting as a sliding touchdown bearing in addition to its role in the emergency braking arrangement. In addition, the braking energy dissipated is dependent upon an external load or the power rating of the flywheel.

With this approach, the limitation on rotor size and weight is no longer an issue since the braking surface area is readily increased to accommodate the larger rotor. This claim is illustrated by a simple comparative calculation. If the diameter of a cylindrical rotor is increased by a factor of n, and assuming that the rotor axial height is fixed, the weight of the rotor has increased by a factor of n2. If the original braking ring contact width is increased by the same factor n, since the diameter of the braking ring is larger by the same factor, the braking ring area has also increased by n2 to keep the contact pressure the same. Thus, while the energy stored increases in proportion to the square of the diameter (with rotor height kept constant), the contact width may only need to be increased linearly to maintain a constant contact pressure and thereby the heat dissipation per unit area. This means that the ratio of the contact width and the diameter is constant and independent of the size (and, thereby, the weight) of the rotor. Thus, the limitations on rotor size with respect to touchdown bearing life inherent in current state-of-the-art is no longer an issue, opening the way for safe operation of very large and heavy rotors.

In the embodiments described, repeated touchdown events are fully feasible and do not require the unit to be taken out of service or disassembled. The contact surfaces are stable with increasing number of operations, the wear debris is low and contained within the vacuum envelope. These factors allow the unit to be put back into operation immediately after a touchdown event, saving downtime and repair costs currently required by existing touchdown bearing configurations. In addition, since the wearing surface geometry on the rotor is axisymmetric, rotor wear resulting from touch down events will not cause an imbalance in the rotor.

Mechanical braking results in heat generation, and in typical operations, most of the heat soaks back into the landing ring and the housing without excessive temperature increases in the rotor. It is generally desirable that the heat is dissipated away from the rotor so that its mechanical properties are not adversely affected. FIG. 3 shows an embodiment where the braking ring is of hollow construction that is filled with recirculating coolant pumped by an automotive water pump 326 through a radiator 327. In another embodiment, the hollow space is filled with a phase change material (e.g., water sodium sulfate, lauric acid, aluminum, copper, gold, iron, lead lithium, silver, titanium, etc.), which absorbs a large amount of heat by virtue of its latent heat of fusion.

Figure 4:
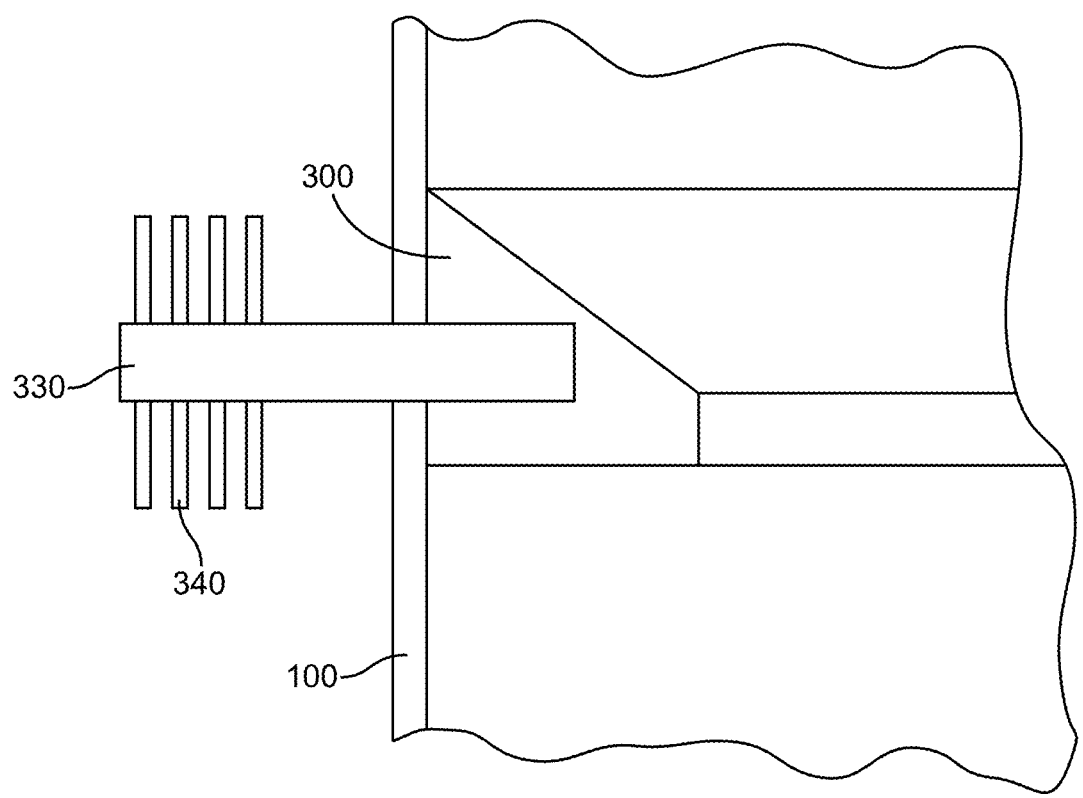
FIG. 4 is a diagram of a mechanical brake where radial heat pipes are attached to an exterior of the housing and connected to an interior of the braking ring to remove heat by air cooling through convective fin extensions, according to an example embodiment.

FIG. 4 shows a radial heat pipe assembly 330 one end of which is inserted into the body of the braking ring 300. Radial heat pipe assembly 330 is attached to the exterior of the housing and connected to the interior of the braking ring to remove heat by air cooling through convective fin extensions 340. Heat transfers from braking ring 300 to heat pipe assembly 330 and convective fin extensions 340 when rotor 200 is lowered or drops onto braking ring 300 while rotor 200 is rotating. The friction between braking ring 300 and rotor 200 causes braking ring 300 to heat up. While heating up, the generated heat transfers to radial heat pipe assembly 330 and convective fin extensions 340. The heat is released into the area outside of cylindrical vacuum housing of the flywheel 100, enabling both braking ring 300 and rotor 200 to be cooled.

Figure 5:
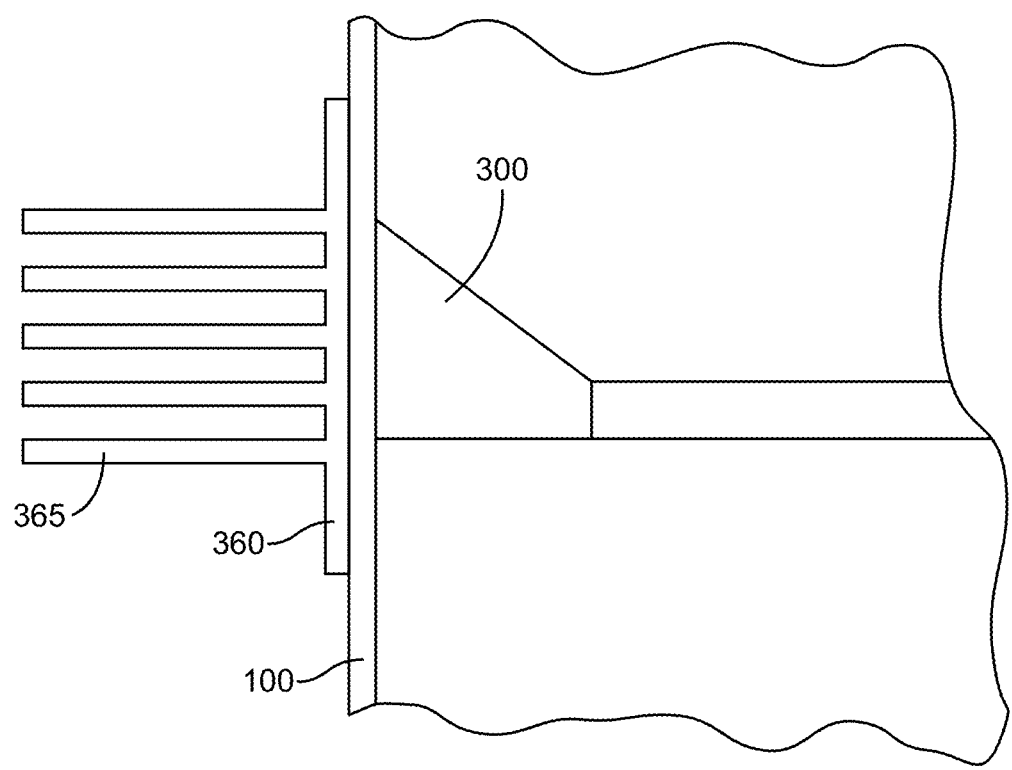
FIG. 5 is a diagram of a mechanical brake where a band of fins is attached to an outside housing near the braking ring to remove heat from within the housing, according to an example embodiment.

FIG. 5 shows an outer conduction band 360 made from a high thermal conducting material such as aluminum and equipped with fins 365 to facilitate heat transfer from the braking ring 300. The outer conduction band 360 with fins 365 (with or without heat pipes) is attached to the outside housing in the vicinity of the braking ring and serves to conduct heat away. Advantageously, none of these embodiments penetrate the vacuum envelope and are relatively easy and inexpensive to put into practice.

Figure 6:
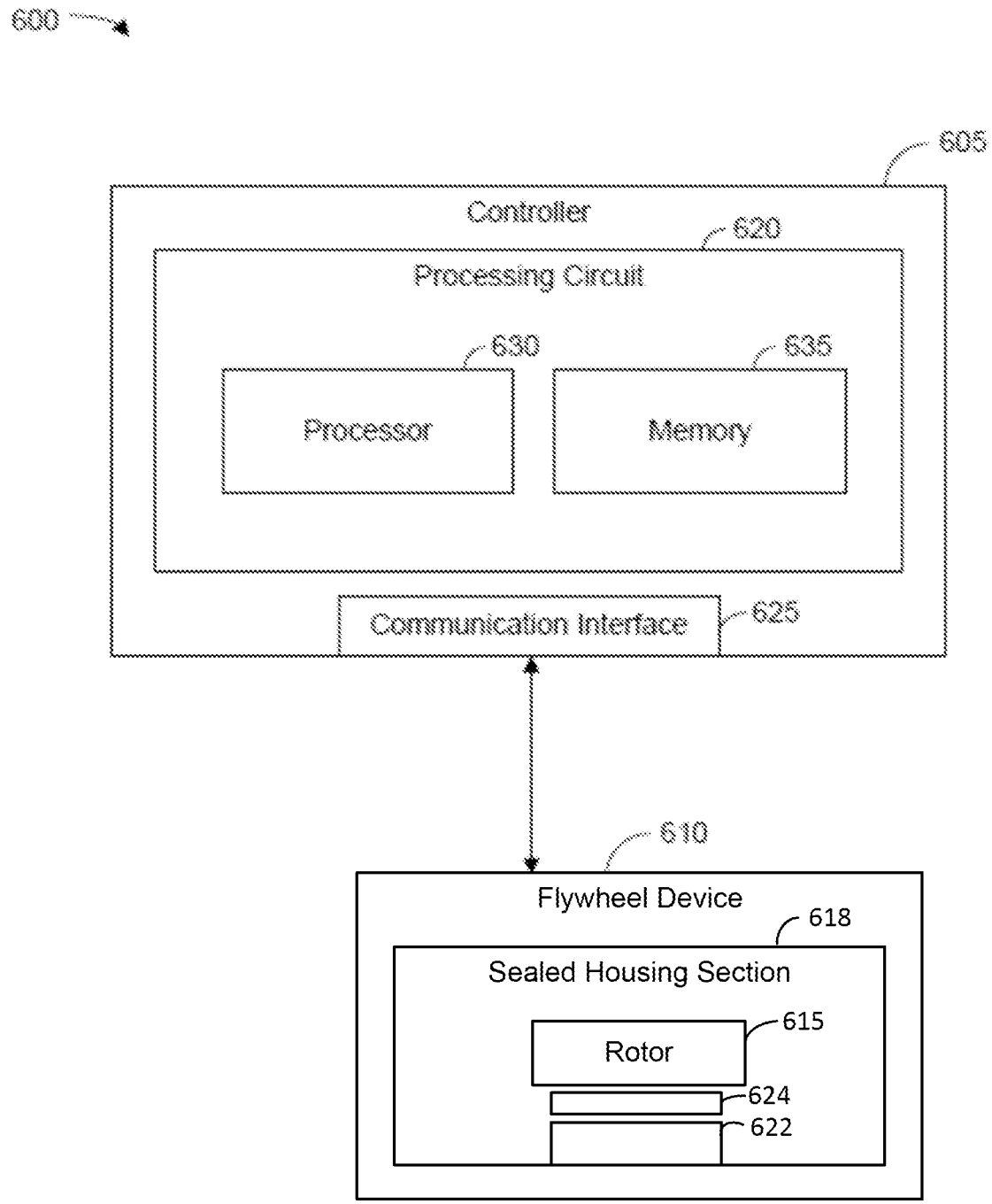
FIG. 6 is a block diagram of a braking control system, according to an example embodiment.

FIG. 6 shows a braking control system 600, according to an example embodiment. Braking control system 600 is shown to include a controller 605 and a flywheel device 610. Controller 605 is the same or similar to the controller described with reference to FIGS. 2 and 3. Flywheel device 610 is the same or similar to cylindrical vacuum housing of the flywheel 100 and its components, shown and described with reference to FIGS. 1-5. Flywheel device 610 is shown to include a rotor 615. Rotor 615 is the same or similar to rotor 200, shown and described with reference to FIGS. 1-5. Controller 605 is the same or different from a controller that causes rotor 615 to rotate or otherwise controls rotor 615. Controller 605 is configured to power magnetic bearings (e.g., magnetic bearings 400, shown and described with reference to FIG. 1) to raise and/or lower rotor 615, in some cases as rotor 615 is rotating. Controller 605 does so by transmitting a signal to a driver (not shown) that transmits a current corresponding to the signal from controller 605 to flywheel device 610 to power the magnetic bearings. Consequently, controller 605 can raise rotor 615 from a sitting state by providing power to the magnetic bearings and maintain a vertical position of rotor 615 by continuing to provide signals to flywheel device 610 as described. Controller 605 can stop providing control signals to flywheel device 610 or provide control signals to the driver that cause the driver to provide a lower power to flywheel device 610 to lower rotor 615 onto an annular ring, ring segments, or pads 622 (e.g., braking ring 300, shown and described with reference to FIGS. 1-5) mounted to an inner face of a cylindrical vacuum housing of flywheel device 610. By causing rotor 615 to contact the annular ring, controller 605 can slow or stop rotor 615 from spinning. In embodiments in which the annular ring has a contact angle of greater than zero degrees, upon controller 605 lowering rotor 615, rotor 615 may contact the annular ring and slide down the annular ring until rotor 615 reaches a resting state. In some embodiments, a drum brake 624 is mounted to a sealed housing section 618 above annular ring, ring segments, or pads 622.

Controller 605 is shown to include a processing circuit 620 and a communication interface 625, in some embodiments. Communication interface 625 may be a receiver, a transmitter, etc. In some embodiments, communication interface 625 may be or include a general input/output (GPIO) unit that enables communication between various pieces of hardware and controller 605. Controller 605 transmits signals to flywheel device 610 through communication interface 625.

Processing circuit 620 is shown to include a processor 630 and memory 635, in some embodiments. Processing circuit 620 is implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. Processor 630 includes an ASIC, one or more FPGAs, a DSP, circuits containing one or more processing components, circuitry for supporting a microprocessor, a group of processing components, or other suitable electronic processing components. In some embodiments, processor 630 executes computer code stored in memory 635 to facilitate the activities described herein. Memory 635 may be any volatile or non-volatile computer-readable storage medium capable of storing data or computer code relating to the activities. According to an exemplary embodiment, memory 635 may include computer code modules (e.g., executable code, object code, source code, script code, machine code, etc.) for execution by processor 630.

In some embodiments, via processor 630, controller 605 is configured to lower rotor 615 upon obtaining an indication to stop or slow rotation of rotor 615. Controller 605 obtains the indication from an external device. For example, controller 605 obtains the indication from a device that monitors rotor 615 for issues that rotor 615 is experiencing, such as overheating. The signal may include a flag or setting indicating the problem. Controller 605 identifies the flag or setting and transmits a signal corresponding to the flag or setting to flywheel device 610 to stop or slow down rotation of rotor 615 accordingly. In another example, controller 605 may receive the signal from a computing device (not shown). A user provides an input to the computing device that causes the computing device to transmit the signal to controller 605. Thus, a user controls rotor 615 from a computing device.

In some embodiments, via processor 630, controller 605 is configured to obtain the indication by determining the indication based on data that controller 605 receives from flywheel device 610. Flywheel device 610 contains or includes sensors that detect the current temperature of flywheel device 610. The sensors are configured to transmit the detected current temperature to controller 605. Controller 605 receives the detected current temperature and determines whether flywheel device 610 is operating in a normal state by comparing the detected current temperature to a threshold. Responsive to determining the detected current temperature exceeds or otherwise satisfies the threshold, controller 605 determines flywheel device 610 is overheating. Consequently, controller 605 generates and transmits a signal to flywheel device 610 that lowers rotor 615 down onto the annular ring to slow or stop rotation of rotor 615. Controller 605 determines flywheel device 610 is operating in an error state based on any data or upon making any determination.

Advantageously, the embodiments described present an inexpensive way to brake large spinning rotors should the bearings malfunction or the device experience sudden instability. In addition, the embodiments show how safe and repeatable touchdown of the rotor is accomplished without the need for an additional rolling contact touchdown bearing and an external resistive load. The embodiments make large, high energy storage capacity flywheel systems feasible and safe without the need for restrictions on rotor mass, power ratings or external loads.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A flywheel device comprising:
   a sealed housing section;
   a rotor located in the sealed housing section; and
   a braking annular ring, ring segments, or pads mounted to the sealed housing section below the rotor.

2. The flywheel device of claim 1, further comprising a brake lining pad coupled to the braking annular ring, the brake lining pad contacting the rotor.

3. The flywheel device of claim 2, wherein the brake lining pad comprises any one of inorganic glass, metal, and carbon.

4. The flywheel device of claim 1, wherein the braking annular ring comprises metal, the metal contacting the rotor.

5. The flywheel device of claim 1, wherein the braking annular ring is axisymmetric with respect to a rotor axis.

6. The flywheel device of claim 1, wherein the braking annular ring comprises a hollow space, the hollow space including a fluid.

7. The flywheel device of claim 6, wherein the fluid comprises coolant.

8. The flywheel device of claim 6, further comprising a water pump and a radiator, wherein the water pump pumps the fluid through the radiator and the hollow space.

9. The flywheel device of claim 6, wherein the fluid is a phase change material.

10. The flywheel device of claim 1, further comprising a heat pipe assembly coupled to an external surface of the sealed housing section and to the braking annular ring.

11. The flywheel device of claim 1, further comprising a conduction band coupled to an external surface of the sealed housing section adjacent to the braking annular ring, the conduction band including fins that perpendicularly extrude from the external surface of the sealed housing section.

12. The flywheel device of claim 11, wherein the conduction band comprises aluminum or other high thermal conductivity material.

13. The flywheel device of claim 1, further comprising a drum brake mounted to the sealed housing section above the braking annular ring.

14. The flywheel device of claim 13, wherein the rotor concurrently or sequentially contacts the braking annular ring and the drum brake.

15. The flywheel device of claim 1, wherein the rotor contacts the braking annular ring at a contact angle of greater than zero degrees.

16. The flywheel device of claim 1, wherein the rotor rotates and contacts the braking annular ring, and wherein contacting the braking annular ring causes the rotor to stop rotating.

17. A flywheel device comprising:
    a sealed housing section;
    a rotor located in the sealed housing section, the rotor held in a vertical position by a magnetic system; and
    a braking annular ring mounted to the sealed housing section below the rotor, wherein the rotor contacts the braking annular ring when the rotor is lowered from the vertical position.

18. The flywheel device of claim 17, wherein the rotor contacts the braking annular ring at a contact angle of greater than zero degrees, and wherein the rotor slides along the braking annular ring while contacting the braking annular ring.

19. A flywheel system comprising a flywheel device and a controller, the flywheel device comprising:
    a sealed housing section;
    a rotor located in the sealed housing section, the rotor held in a vertical position by a magnetic system;
    a controller coupled to the magnetic system, the controller performing operations to:
      provide control signals to provide first power to the magnetic system to hold the rotor in the vertical position; and
      provide second control signals to provide second power to the magnetic system to lower the rotor; and
    a braking annular ring mounted to the sealed housing section below the rotor, wherein the rotor contacts the braking annular ring when the rotor is lowered from the vertical position.

20. The flywheel system of claim 19, wherein the rotor rotates and the controller further performs operations to:
    obtain an indication indicating for the rotor to stop rotating; and
    wherein the controller provides the second control signals to provide the second power to the magnetic system to lower the rotor responsive to obtaining the indication.

* * * * *